United States Patent
Jeswani et al.

(10) Patent No.: US 11,907,822 B2
(45) Date of Patent: Feb. 20, 2024

(54) CONTROLLING CONVERSATIONAL DIGITAL ASSISTANT INTERACTIVITY

(71) Applicant: Microsoft Technology Licensing, LLC, Redmond, WA (US)

(72) Inventors: Sapna Daryanomal Jeswani, Seattle, WA (US); Ajoy Nandi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/500,520

(22) Filed: Oct. 13, 2021

(65) Prior Publication Data
US 2022/0051072 A1 Feb. 17, 2022

Related U.S. Application Data

(63) Continuation of application No. 15/868,696, filed on Jan. 11, 2018, now Pat. No. 11,176,437.

(51) Int. Cl.
| | |
|---|---|
| *G06N 3/006* | (2023.01) |
| *H04L 51/18* | (2022.01) |
| *H04L 51/02* | (2022.01) |
| *G06F 16/2452* | (2019.01) |
| *G06F 16/332* | (2019.01) |
| *G06Q 10/10* | (2023.01) |
| *G06F 16/335* | (2019.01) |
| *G06Q 30/0601* | (2023.01) |
| *H04L 51/216* | (2022.01) |

(52) U.S. Cl.
CPC ....... *G06N 3/006* (2013.01); *G06F 16/24522* (2019.01); *G06F 16/335* (2019.01); *G06F 16/3329* (2019.01); *G06Q 10/10* (2013.01); *G06Q 30/0613* (2013.01); *H04L 51/02* (2013.01); *H04L 51/18* (2013.01); *H04L 51/216* (2022.05)

(58) Field of Classification Search
CPC .............. G06N 3/006; G06F 16/24522; G06F 16/3329; G06F 16/335; G06Q 10/10; G06Q 30/0613; H04L 51/02; H04L 51/16; H04L 51/18; H04L 21/216
USPC .......................................................... 706/11
See application file for complete search history.

(56) References Cited

U.S. PATENT DOCUMENTS

| | | | |
|---|---|---|---|
| 8,660,849 B2 * | 2/2014 | Gruber | G10L 15/26 340/988 |
| 10,922,738 B2 * | 2/2021 | Swierk | H04M 3/5166 |
| 11,257,496 B2 * | 2/2022 | Chakraborty | G10L 15/1815 |

(Continued)

*Primary Examiner* — William D Titcomb (57) ABSTRACT

Interaction between a user and a conversational digital assistant executing on a computing device is controlled. Multiple interaction pairs are stored in one or more datastores accessible by the conversational digital assistant. Each interaction pair includes an interaction query and an associated assistance operation. An interactive engagement event is detected between the user and the conversational digital assistant, responsive to the storing operation. An interaction pair is selected from the one or more datastores, responsive to the operation of detecting an interactive engagement event. The interaction query of the selected interaction pair is communicated to the user. The assistance operation associated with the communicated interaction query is executed, responsive to receipt of a response from the user to the interaction query.

20 Claims, 7 Drawing Sheets

(56) References Cited

U.S. PATENT DOCUMENTS

| | | | |
|---|---|---|---|
| 11,455,549 B2* | 9/2022 | Abrams | G06N 3/006 |
| 2013/0111348 A1* | 5/2013 | Gruber | G10L 15/26 |
| | | | 715/727 |
| 2015/0294377 A1* | 10/2015 | Chow | G06Q 30/0263 |
| | | | 705/347 |
| 2018/0181716 A1* | 6/2018 | Mander | G16H 50/20 |
| 2018/0255005 A1* | 9/2018 | Agarwal | G06F 40/295 |
| 2019/0172565 A1* | 6/2019 | Kartoun | G16H 10/60 |

* cited by examiner

CONTROLLING CONVERSATIONAL DIGITAL ASSISTANT INTERACTIVITY

CROSS-REFERENCE TO RELATED APPLICATIONS

This application is a continuation application of U.S. patent application Ser. No. 15/868,696, filed Jan. 11, 2018, the entire disclosure of which is hereby incorporated herein by reference.

BACKGROUND

Conversational digital assistants ("digital assistants") can provide audible or visible interaction between a user and a computing device or service. For example, a user can ask "What's the weather forecast today?" and the digital assistant may respond with an audible and/or visible weather forecast (e.g., "Today will be mostly sunny in the afternoon, with a high of 75 degrees and a low of 50 degrees"). However, digital assistant interaction between a user and a digital assistant is initiated by the user, both in terms of timing and subject matter domain. A digital assistant lacks the capability of taking a conversation in a new or different direction after a user has initially engaged with the digital assistant by asking a question or giving a command. As such, digital assistant interaction with a user tends to be wholly responsive or reactive to the user's inquiry or command.

SUMMARY

Implementations described and claimed herein address the foregoing by providing a conversational digital assistant with an ability to interact with a user on what appears to be its own initiative and/or about its own interests. Interaction between a user and a conversational digital assistant executing on a computing device is controlled. Multiple interaction pairs are stored in one or more datastores accessible by the conversational digital assistant. Each interaction pair includes an interaction query and an associated assistance operation. An interactive engagement event is detected between the user and the conversational digital assistant, responsive to the storing operation. An interaction pair is selected from the one or more datastores, responsive to the operation of detecting an interactive engagement event. The interaction query of the selected interaction pair is communicated to the user. The assistance operation associated with the communicated interaction query is executed, responsive to receipt of a response from the user to the interaction query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

The disclosed technology provides a conversational digital assistant with an ability to interact with a user on what appears to be its own initiative and/or about its own interests. For example, if the user asks "What's the weather forecast today?", the digital assistant can provide the weather forecast and then follow up with "I know you are a Seahawks fan, and the weather will be excellent for their home game today. Would you like me to provide you with an update on every scoring play and turnover?" In this manner, the digital assistant can expose the user to new and/or undiscovered functionality of the digital assistant. In other implementations, the digital assistant can spawn assistance operations responsive to a user command/request, and set itself to follow up with the user during a future interaction engagement event.

A technical effect of the disclosed technology provides a richer and more natural user-assistant interaction in which the assistant has the capability of directing the interaction to address open issues that the digital assistant has collected over time. Accordingly, functionality and/or information possessed by or accessible to the digital assistant can be queued up and intelligently provided to the user in response to a detected interaction engagement event (e.g., future interaction initiated by the user).

Figure 1:
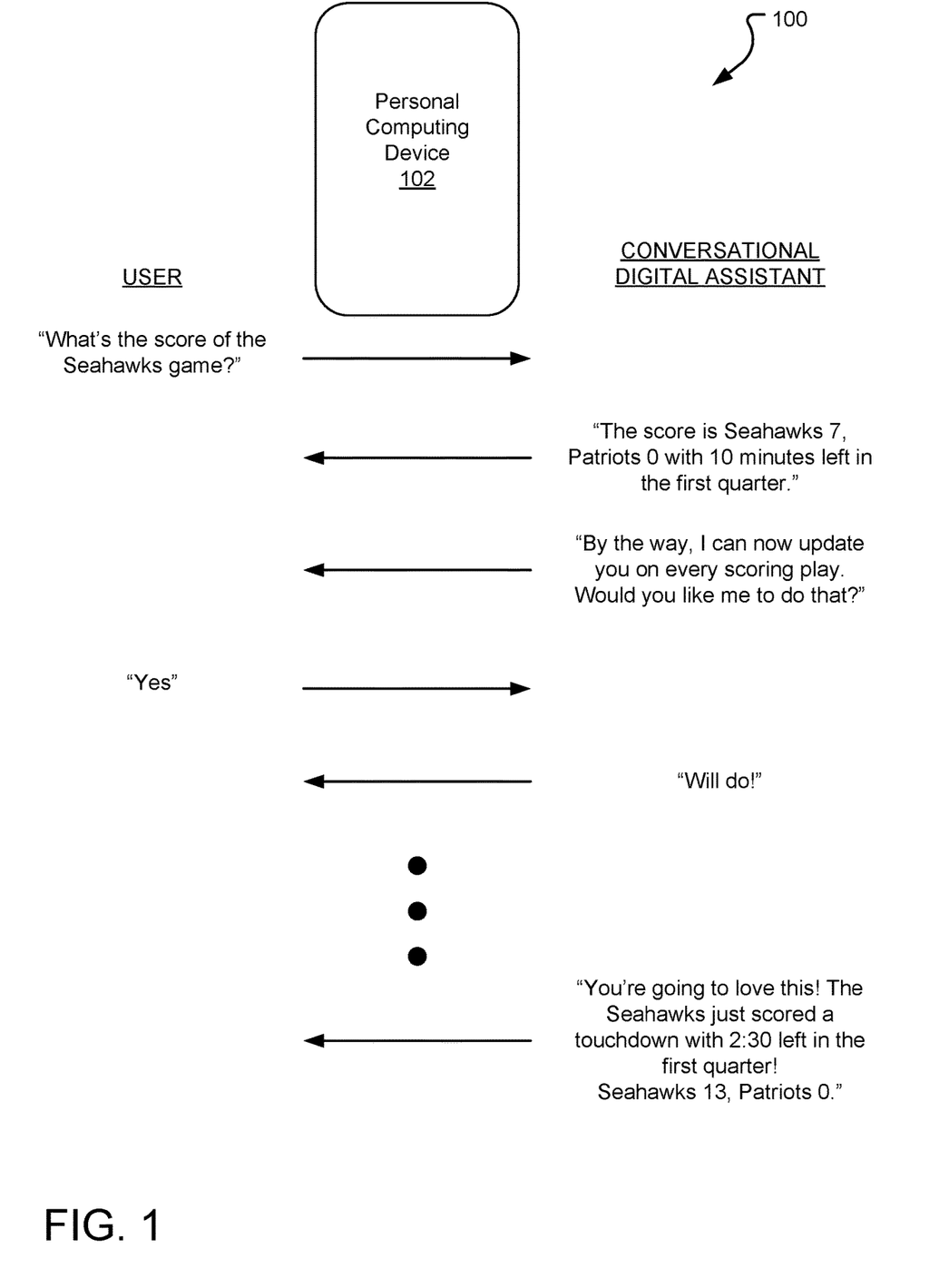
FIG. 1 illustrates an example conversation between a user and a conversational digital assistant via a computing device.

FIG. 1 illustrates an example conversation 100 between a user and a conversational digital assistant via a personal computing device 102. A conversational digital assistant executing on the personal computing device 102 monitors various input interfaces of the personal computing device 102, such as a microphone and/or touch inputs, to detect a user interaction engagement event. In this example, the user initiates engagement with the conversational digital assistant by asking "What's the score of the Seahawks game?", although this engagement may be preceded by a spoken trigger (e.g., "Hey assistant?"), touch input (e.g., pressing a button or a touch screen), or some other triggering input.

The user's interaction may also be considered a user-initiated interaction engagement event in the form of a question requesting a score or a command instructing the conversational digital assistant to provide the score of the game. Responsive to the user initiated interaction engagement event, the conversational digital assistant accesses a scoring service, scoring application, or score database to obtain the current score and responds accordingly: "The score is Seahawks 8, Patriots 0 with 10 minutes left in the first quarter."

In FIG. 1, an interaction control subsystem of the conversational digital assistant then takes the initial engagement further than that initiated by the user to ask a follow-up question: "By the way, I can now update you on every scoring play. Would you like me to do that?" With this subsequent interaction, the conversational digital assistant triggers its own interaction with the user, in this case introducing some new, recently unused, or previously undiscovered functionality to the user. The user responds "Yes" to instruct the conversational digital assistant to proceed with the scoring updates. In the illustrated implementation, the conversational digital assistant confirms the user's instructions and turns on the scoring update functionality, whether locally or remotely. As a result, the conversational digital assistant automatically provides updates to the user after each scoring play, rather than only upon request by the user: "You are going to love this! The Seahawks just scored a touchdown with 2:30 left in the first quarter. Seahawks 13. Patriots 0." Such updates will continue throughout the game unless terminated by the user.

Other example interactions are contemplated. In one interaction, the user could request the conversational digital assistant "Notify me of any new job postings for a principal software engineer," "Notify me of candidates that have SPARK in their experience or skills and send them an auto-email with this job description," and "Congratulation Anna on her five-year work anniversary." The variations in interactive engagement events and subsequent assistant-triggered interactions are without practical limitation.

In the case of the "new job postings" command, the conversational digital assistant may spawn one or more job posting searches to one or more online professional career service, such as LinkedIn.com. When a result is found (or no result is found after a period of time), the conversational digital assistant may create a record for a future interaction, which may trigger after a future interaction engagement event with the user. For example, after the user asks for an update on his or her schedule, the conversational digital assistant may respond with "I found one of those programmer job postings. Would you like to hear it now?" or "By the way, still no luck with the programmer job postings. Would you like me to keep looking?"

It should be understood that, in some circumstances, the recorded interaction may be selected by the conversational digital assistant in response to a user query or command. For example, the user could initiate an interaction engagement event with "What's the status on that job posting search?", and the conversational digital assistant could select the already waiting interaction from an interaction datastore to respond to the query with the most recent result. Likewise, the conversational digital assistant may react to a notification received from the online professional career service and notify the user of new information on the search (e.g., issuing an audible or visual alert or a request for interaction with the user).

Other selections triggers are also contemplated, and different selection triggers may be applied to different interaction pairs. For example, the conversational digital assistant may select three interaction pairs to present to a user after detection of an interaction engagement event: (1) "Do you want me to turn on Seahawks scoring updates?", (2) "While we are talking, based on the data I have so far, I think I know where you work. Would you mind going over steps to confirm your work address for me?" and (3) "Do you work at 1600 Pennsylvania Ave NW, Washington, DC 20500?" All three questions may be selected for presentation after the same interaction engagement event, and yet be selected based on different selection criteria. The "scoring update" query may be selected because the user engaged the conversational digital assistance to ask how long it will take to drive from work to the Seahawks game at CenturyLink Field. The "work address" query may be selected because the user has not yet recorded a work address with the conversational digital assistant and the user's query made this address query more relevant (e.g., increasing a priority weighting for the interaction pair). The increase in relevance may be adjusted based on real-time computation by the conversational digital assistant and/or other applications and services. If the user says "No," then the interaction pair for the "work address" query can be put back in the interaction datastore for future selection. Otherwise, the specific work address confirmation query may then be selected because of a sequential relationship between this query and the previous query. The sequential relationship may be represented by shifting priority weightings, explicit sequential dependency annotations, contextual annotations, etc. In this manner, intelligent question and answer interactions may be presented in a natural manner to the client.

Figure 2:
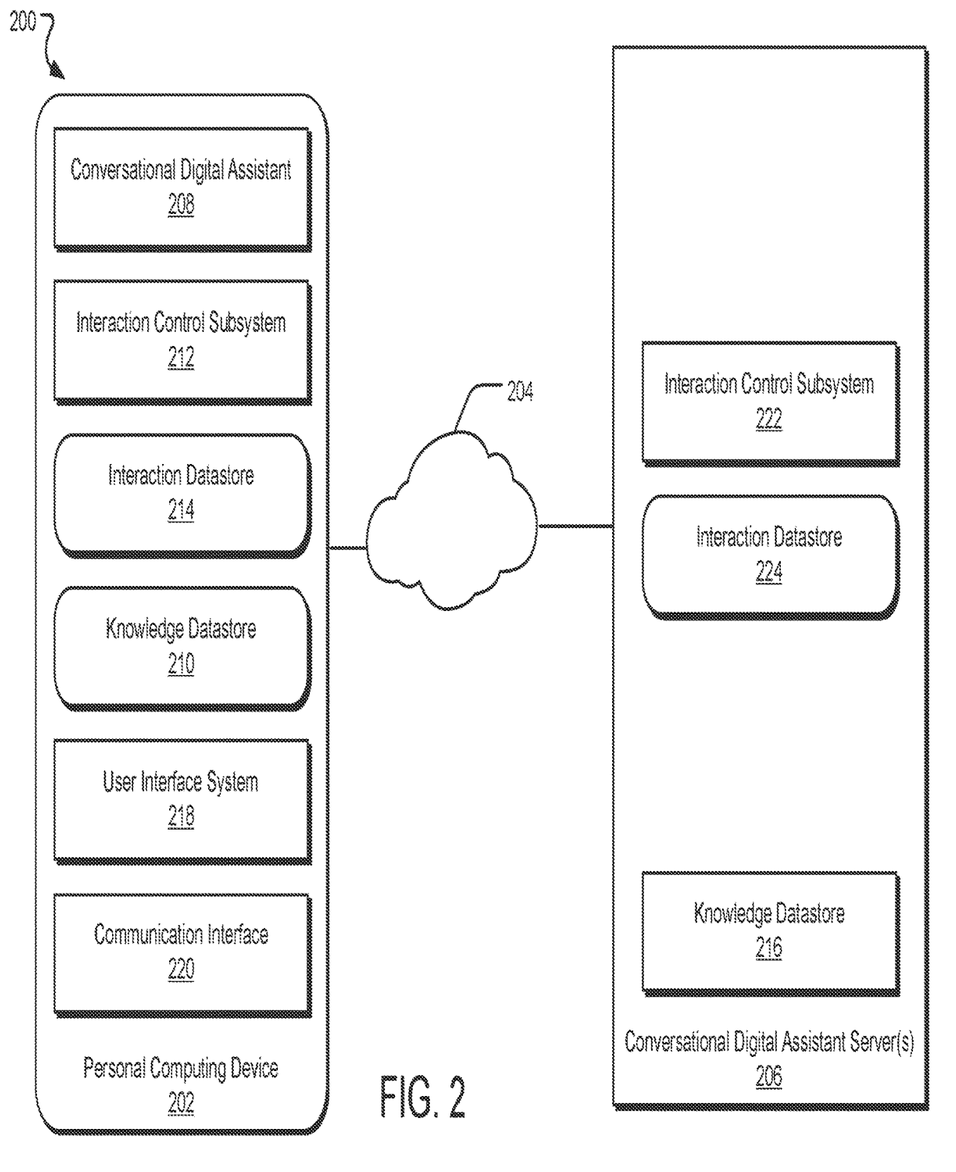
FIG. 2 illustrates an example computing environment controlling conversational digital assistant interactivity.

FIG. 2 illustrates an example computing environment 200 controlling conversational digital assistant interactivity. A personal computing device 202 is communicatively connected through a communications network 204 to one or more conversational digital assistant servers 206. The described technology may be implemented in the personal computing device 202, in the conversational digital assistant servers 206, or a combination of both.

The personal computing device 202 executes a conversational digital assistant 208 that can help a user perform tasks through one or more computing devices. Such tasks may include without limitation providing visible and/or audible notifications, (e.g., scoring updates), initiating phone calls, searching for shopping deals, setting reminders, sending emails and text messages, and researching public and private sources. The conversational digital assistant 208 can monitor and/or access without limitation other applications, operating system functions, local and remote services, and various input/output interfaces, such as sensors (e.g., microphones and accelerometers), displays, audio output interfaces, and haptic output mechanisms. The conversational digital assistant 208 can also monitor and/or access without limitation local and remote data, such as user-contextual data, GPS data, accelerometer data, Wi-Fi location data, image data from a camera, touch data from a touch interface, and audio data from a microphone. Such functionality, interfaces, and data can inform the interaction of the conversational digital assistant 208 with the user and with other systems.

The conversational digital assistant 208 can monitor user activities within one or more other applications and store records of such activity in a knowledge datastore 210. The knowledge datastore 210 can also store details of events performed through the personal computing device 202 running an instance of the conversational digital assistant 208. For example, a user can use the personal computing device 202 to call a co-worker, and a record of the call (e.g., phone number, time and date of the call, the call duration, relevant contact information) is stored in the knowledge datastore 210. Some information of the record (e.g., call duration) may come from the phone application itself, while other information (e.g., contact name) may come from a contacts application accessible to or running on the personal computing device 202.

An interaction control subsystem 212 of the personal computing device 202 manages user-device interaction triggered by the conversational digital assistant 208. For example, when the conversational digital assistant 208 completes an online shopping task (e.g., searching for the best price on a 4K TV in the user's proximity), the interaction control subsystem 212 stores an interaction pair in an interaction datastore 214, which sets the conversational digital assistant 208 up for future user interaction. In one implementation, the interaction pair includes an interaction query and an assistance operation. In other implementations, the interaction pair is annotated with contextual metadata, so as to associate the interaction pair with certain contexts (e.g., phone, Bob Smith, Seahawks). In this implementation, the contextual metadata assists with searching for an interaction pair that is related to a contemporaneous interaction engagement initiated by the user. For example, if the user asks "What is the score of the Seahawks game?", the conversational digital assistant can respond with the score and then search the metadata of interaction pairs in the interaction datastore 214 for interaction pairs related to sports, football, Seahawks, and any other contextual annotations provided for the interaction pair. The contextual annotations can facilitate a new assistant-initiated interaction that is related to the user-initiated interaction engagement, rather than being an independent or even orthogonal interaction (e.g., "Would you like to call Bob Smith?"). Selection based on such a relationship can provide a more natural user-assistant interaction experience.

The interaction between the user and the conversational digital assistant 208 can be associated with contexts, data for which can be stored in the knowledge datastore 210 in memory/storage of the personal computing device 202 and/or in a knowledge datastore 216 in memory/storage of the conversational digital assistant servers 206. For example, if the user asks "Call Bob?", the conversational digital assistant 208 can reference the knowledge datastore 210 and/or 216 in an attempt to determine the "Bob" to which the user is referring, such as from recent call logs and emails. Likewise, an interaction control subsystem 222 and/or an interaction datastore 224 may also reside (e.g., be executed or stored at) the conversational digital assistant servers 206.

The conversational digital assistant 208 can communicate with the user via a user interface system 218, such as a display, a microphone, a speaker, and/or a haptic feedback mechanism. The conversational digital assistant 208 can communicate with the conversational digital assistant servers 206 and other communication and data services via a communications interface 220, such as a Wi-Fi interface, an Ethernet interface, and an LTE communications interface.

Although FIG. 2 is described as having certain functionality of the conversational digital assistant 208 divided between the personal computing device 202 and one or more conversational digital assistant servers 206, other implementations may move some or all of the described functionality to either the personal computing device 202 or one or more conversational digital assistant servers 206.

Figure 3:
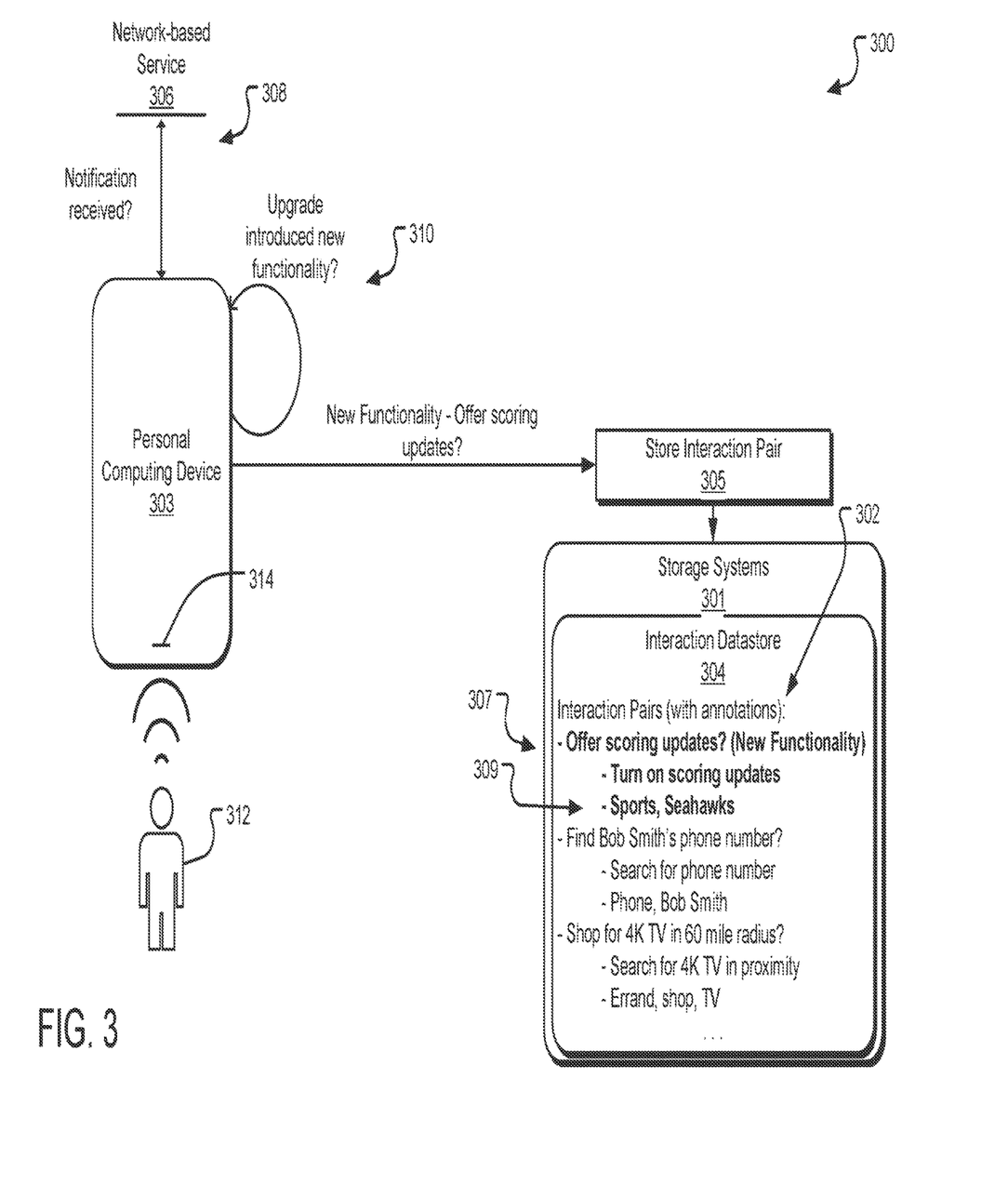
FIG. 3 illustrates an example system storing interaction pairs in one or more tangible data storage systems for controlling conversational digital assistant interactivity.

FIG. 3 illustrates an example system 300 storing interaction pairs 302 in one or more tangible data storage systems 301 for controlling conversational digital assistant interactivity. A conversational digital assistant executing on a personal computing device 303 can monitor a variety of events that trigger storage (by a storing operation 305) of an interaction pair 307 in an interaction datastore 304 of the one or more tangible data storage systems 301 accessible by the conversational digital assistant. The storing operation 305 can be viewed as an operation for opening an incomplete task record in the interaction datastore, with the expectation that the conversational digital assistant will present an interaction query to the user at some future time (e.g., after or during a future interaction engagement with the user) in an effort to complete the task and close the incomplete task record (e.g., remove it from the interaction datastore 304).

The interaction pairs 302 include an interaction query (e.g., "Offer scoring updates? (New Functionality)") and an assistance operation (e.g., "Turn on scoring updates"). It should be understood that interaction queries need not be in the form of a question; they represent the subject matter of a future assistant-initiated conversation with the user. As such, an interaction query could be in the form of an instruction (e.g., "Offer user scoring update functionality"), actual dialog ("By the way, I can now update you on every scoring play. Would you like me to do that?"), a pointer or index into a data structure providing data and/or code for the assistant-initiated conversation, or other data storage formats. An assistance operation represents an operation that the conversational digital assistant executes on the personal computing device 303, associated servers, and/or third-party servers responsive to authorization by the user (e.g., a user response). For example, if the user authorizes the conversational digital assistant to provide scoring updates, the conversational digital assistant can execute a local operation turning on scoring updates or send an instruction to a remote service to turn on scoring updates.

Another type of event that can initiate storage of an interaction pair in the interaction datastore 304 is referred to as a commitment. A conversational digital assistant can monitor user activity on various devices and cloud-connected systems and services. As such, the conversational digital assistant can monitor a text message from the user promising to buy a pizza on the way home from work. The conversational digital assistant can identify this text message as a "commitment" and store an interaction pair to remind the user of the commitment (e.g., "By the way, don't forget to buy a pizza on the way home from work tonight. Do you want me to give you a reminder when you leave the office?").

Example events that may trigger the storage of an interaction pair record can include without limitation:
  Notifications from a network-based service 306 (see notification event 308)
  Internal system changes (see, e.g., the introduction of new functionality in event 310)
  Verbal input by the user (see, e.g., a spoken command or question from the user 312 received by a microphone 314 of the personal computing device 303)
  Detected commitments detected from other user activities (e.g., from emails, text messages, meeting notes, calendars)

For example, the user 312 may ask the conversational digital assistant to search for concert tickets within a specified price range. The conversational digital assistant may find no tickets satisfying the user's criteria but then offer to continue searching for such a ticket via various ticketing services. If authorized by the user, the interaction control subsystem can then store an interaction pair in the interaction datastore 304 setting up an assistant-initiated offer to update the user on the ticket search operation at some future interaction engagement. In another example, a network-based service may return a notification that a previously-requested pair of concert tickets has been found by a ticketing service at the user's requested price. Responsive to this notification, the conversational digital assistant may immediately notify the user and/or an interaction control subsystem may store an interaction pair in the interaction datastore 304 to update the user about the ticket at a future interaction engagement. The interaction pair may include an interaction query "Found the tickets for $100 each. Do you want me to buy them?" with an assistance operation to execute the purchase through the ticketing service. For the user, the experience may be as follows: an audible or haptic notification, followed by the user's query "What's up?", followed by the interaction query "Found the tickets for $100 each. Do you want me to buy them?"

Certain contextual annotations may also be stored in association with an interaction pair 307, such as "Sports, Seahawks" 309. Such context can enhance the appropriateness of an assistant-initiated interaction by allowing the conversational digital assistant to search for interaction pairs that relate to a current interaction engagement or other circumstances. In one implementation, for example, the conversational digital assistant would be more likely to follow up a question about a game score with an interaction query relating to sports. Alternatively, the conversational digital assistant may use other parameters for selecting an appropriate interaction pair, whether related to the current interaction engagement or not, including without limitation urgency, proximity, time, scheduled calendar events, and predicted user behavior (e.g., shopping preferences or needs). For example, when asked about a score of a game, the conversational digital assistant may respond with the score and then say "While I have your attention, I wanted to let you know that I found that TV you've been looking for. Do you want me to tell you about it or give you directions to the store?" As such, the "appropriate" interaction pair can be selected based on contextual parameters and can be related to or independent of the current interaction engagement.

In addition to independent selection and related selection of interaction pairs by the conversational digital assistant, selection may also be made or influenced by an interaction schedule, such as in real time (when the interaction pair is available), subject to certain preferred interrupt times (e.g., after work, before bedtime, before work), in real time and at a preferred interrupt time, etc. Also, multiple interactions may be selected for the user, such as to update the user on multiple pending operations. For example, in one scenario, a wearable device may summarize a few outstanding operations before work to keep the user updated on the status of the operations and any incremental results thereof.

Figure 4:
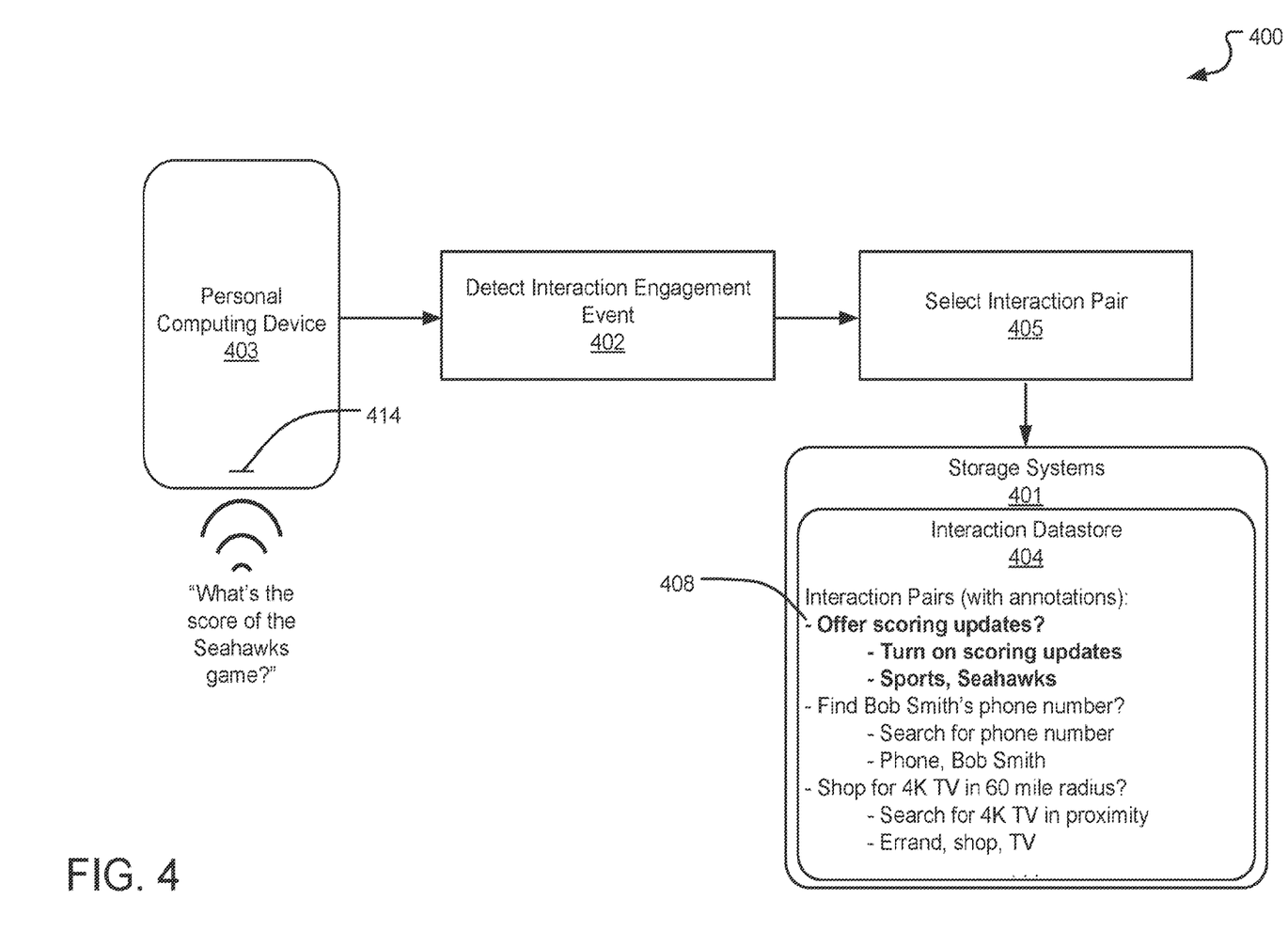
FIG. 4 illustrates an example system selecting an interaction pair from one or more tangible data storage systems for controlling conversational digital assistant interactivity.

FIG. 4 illustrates an example system 400 selecting an interaction pair from one or more tangible data storage systems 401 for controlling conversational digital assistant interactivity. A conversational digital assistant executing on a personal computing device 403 can detect an interaction engagement event in a detecting operation 402, such as detecting a user query through a microphone 414—"What's the score of the Seahawks game?" The interaction datastore 404 stores interaction pairs recorded prior to the detection of the interaction engagement event. Responsive to such detection, a selecting operation 405 selects an appropriate interaction pair from the interaction datastore 404 stored in the one or more tangible data storage systems 401. In the illustrated example, because the user's query relates to the "Seahawks," the selecting operation 405 selects the "Offer scoring updates?" interaction pair 408, based on the contextual annotations "Sports, Seahawks." Other selection preferences may be applied, as previously discussed.

Figure 5:
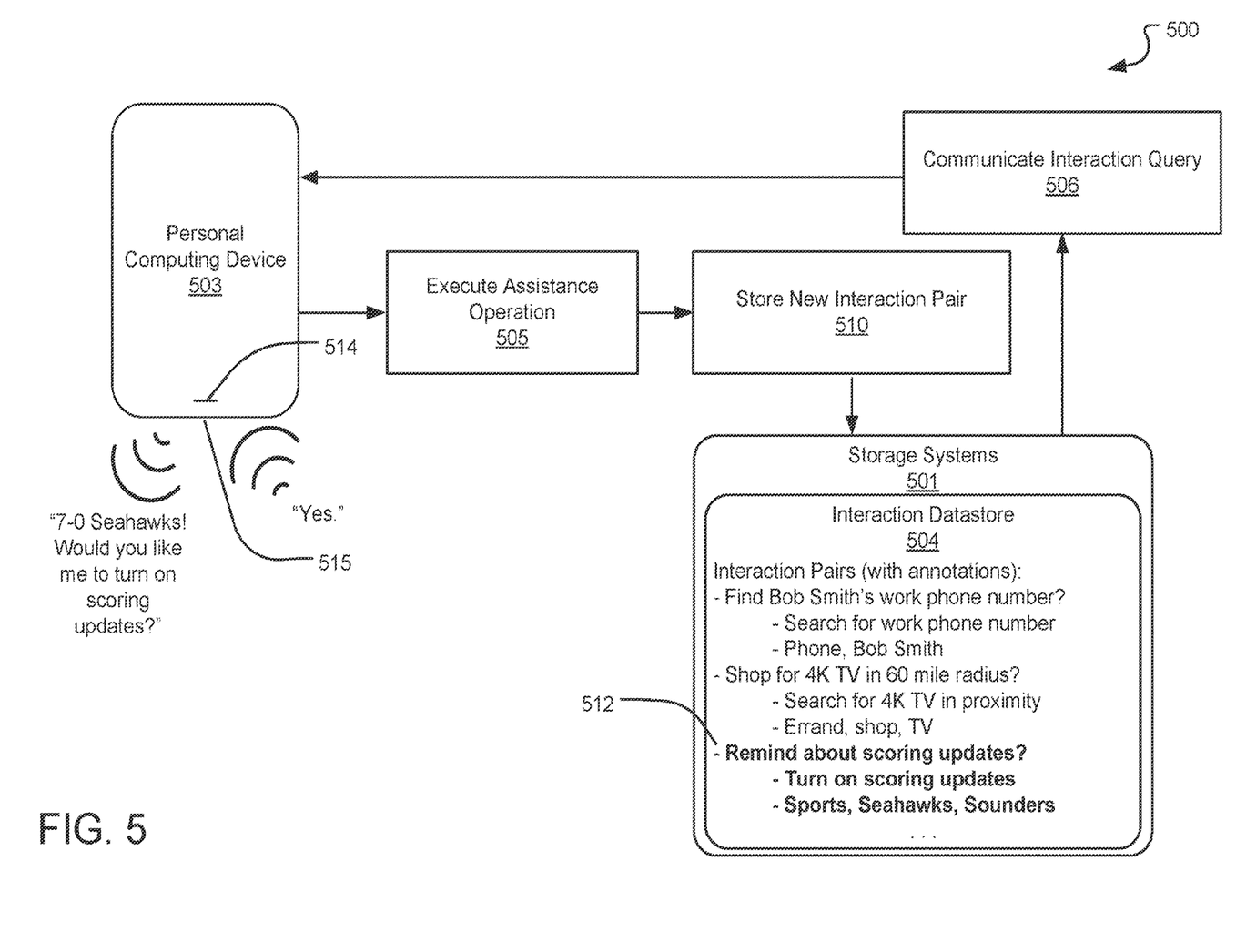
FIG. 5 illustrates an example system executing interaction between a user and a conversational digital assistant for controlling conversational digital assistant interactivity.

FIG. 5 illustrates an example system 500 executing interaction between a user and a conversational digital assistant for controlling conversational digital assistant interactivity. A conversational digital assistant executing on a personal computing device 503 had previously selected an interaction pair relating to an offer to provide scoring updates. A communicating operation 502 extracts the selected interaction pair from the interaction datastore 504 stored in one or more data storage systems 501, and a communicating operation 506 communicates the interaction query "7-0 Seahawks! Would you like me to turn on scoring updates?" to the personal computing device 503, which outputs the interaction query to the user (e.g., through a speaker 515 or a display). The conversational digital assistant detects the user's response "Yes" via the microphone 514 (or via another input interface).

Responsive to receipt of the user's authorization, the conversational digital assistant triggers execution of the assistance operation 505. In this example, the assistance operation 505 toggles a setting to provide scoring updates when they are received, rather than when the user explicitly requests a scoring update. In an example of some of the more complicated assistance operations, the assistance operation may involve initiating the operation via an application or service and waiting for the operation to return a result after a delay to allow the operation to complete. Alternative assistance operations, such as performing shopping research, searching public or private databases, and monitoring changes in available information or system states (e.g., to detect the availability of a conference room at a request time and building), may be executed on the personal computing device 503, on one or more conversational digital assistant servers, or in other applications or services. The conversational digital assistant may inform the user of execution and/or completion of the assistance operation.

With regard to FIG. 5, the assistance operation turns on the scoring updates feature, per the user's authorization. A storage operation 510 stores a new interaction pair 512 to remind the user of the scoring update feature in the future. In this manner, the conversational digital assistant can follow up on the previous assistant-initiated interaction in a similar fashion to a human assistant reminding boss of little-used procedural rule or software feature. In FIG. 5, the new interaction pair 512 is set to remind the user of the scoring update feature again as some future interaction engagement event.

Security and privacy are relevant considerations in this technology. As such, the conversational digital assistant may also respond to a direct user command/query to turn off certain functionality. For example, the user may command the conversational digital assistant to "Turn off Seahawks scoring updates," and the assistant will do so. In contrast, the conversational digital assistant may be aware that the user hasn't used scoring updates in a long period of time and therefore set up an interaction pair for "I've noticed that you haven't used scoring updates recently. Would you like me to turn off this functionality and delete the associated data?" The user may not have even been aware that the scoring updates were still turned on or that it was still storing a tree of references/associations/contexts/inferences in a knowledge datastore. As such, a reminder interaction pair may be recorded in the interaction datastore to be used by the conversational digital assistant to clean up memory, enhances security/privacy, etc.

Figure 6:
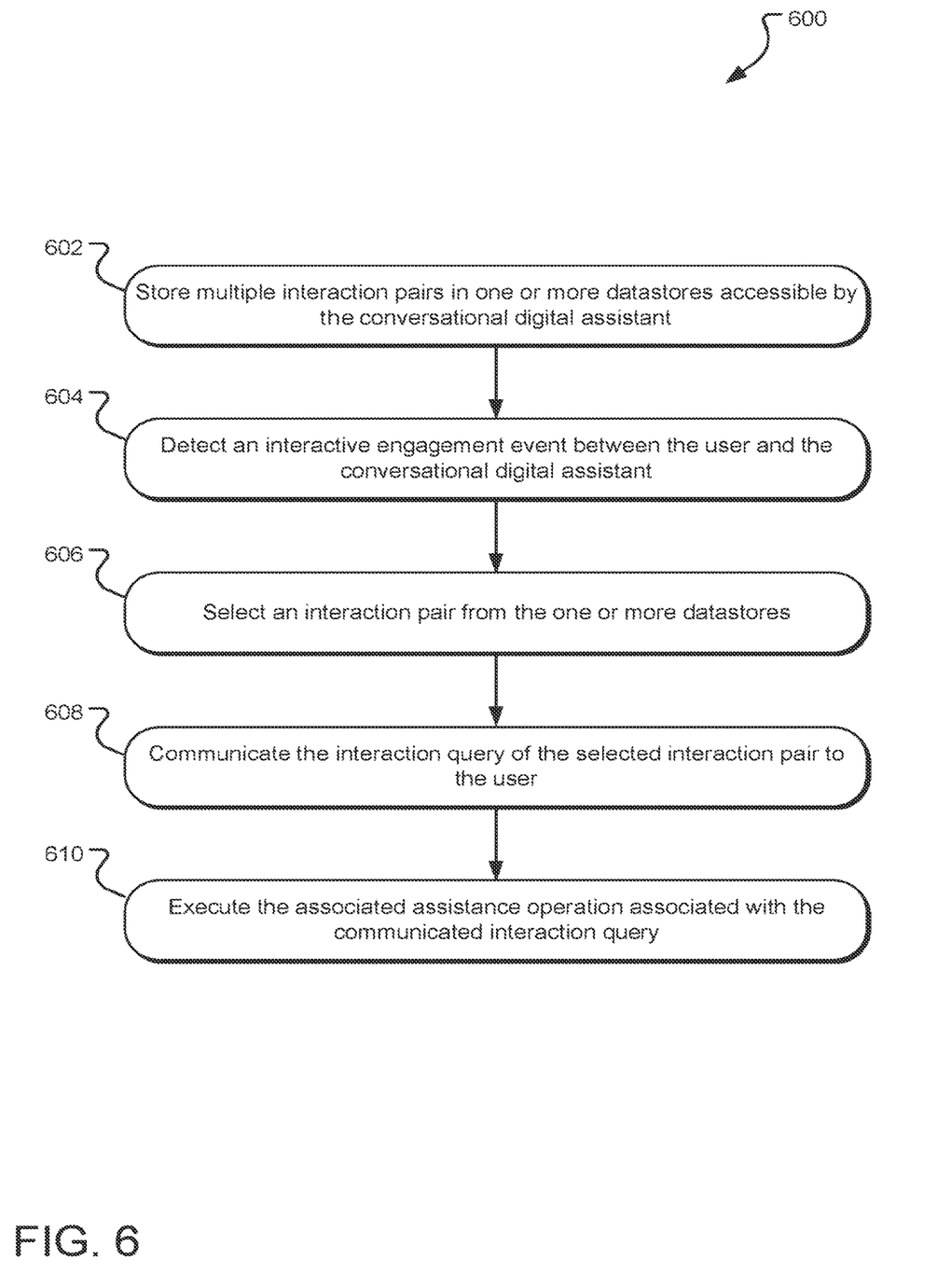
FIG. 6 illustrates example operations for controlling conversational digital assistant interactivity.

FIG. 6 illustrates example operations 600 for controlling conversational digital assistant interactivity. A storing operation 602 stores multiple interaction pairs in one or more datastores accessible to the conversational digital assistant. Each interaction pair includes an interaction query and an associated assistance operation and may be annotated by contextual parameters. The interaction pairs may be searched by the conversational digital assistant to identify an appropriate interaction query, responsive to detection by a detection operation 604 of an interaction engagement event between a user and the conversational digital assistant. The identified interaction query is selected by a selection operation 606 to provide assistant-initiated interaction with a user. "Assistant-initiated" means that the interaction was not simply responsive to a question or command from a user. Instead, the interaction query was stored in the interaction datastore prior to the associated user-initiated interaction engagement event and triggered by the conversational digital assistant after detection of the user-initiated interaction engagement event by the detection operation 604.

A communication operation 608 communicates the interaction query of the selected interaction pair to the user, such as via a display or speaker. An assistance operation 610 executes an assistance operation associated with the communicated interaction query, responsive to user authorization. In this manner, the conversational digital assistant initiates supplemental interaction with the user to request authorization to spawn an assistance operation (such as turning on scoring updates, searching for an unknown phone number, and searching for a desired product).

Figure 7:
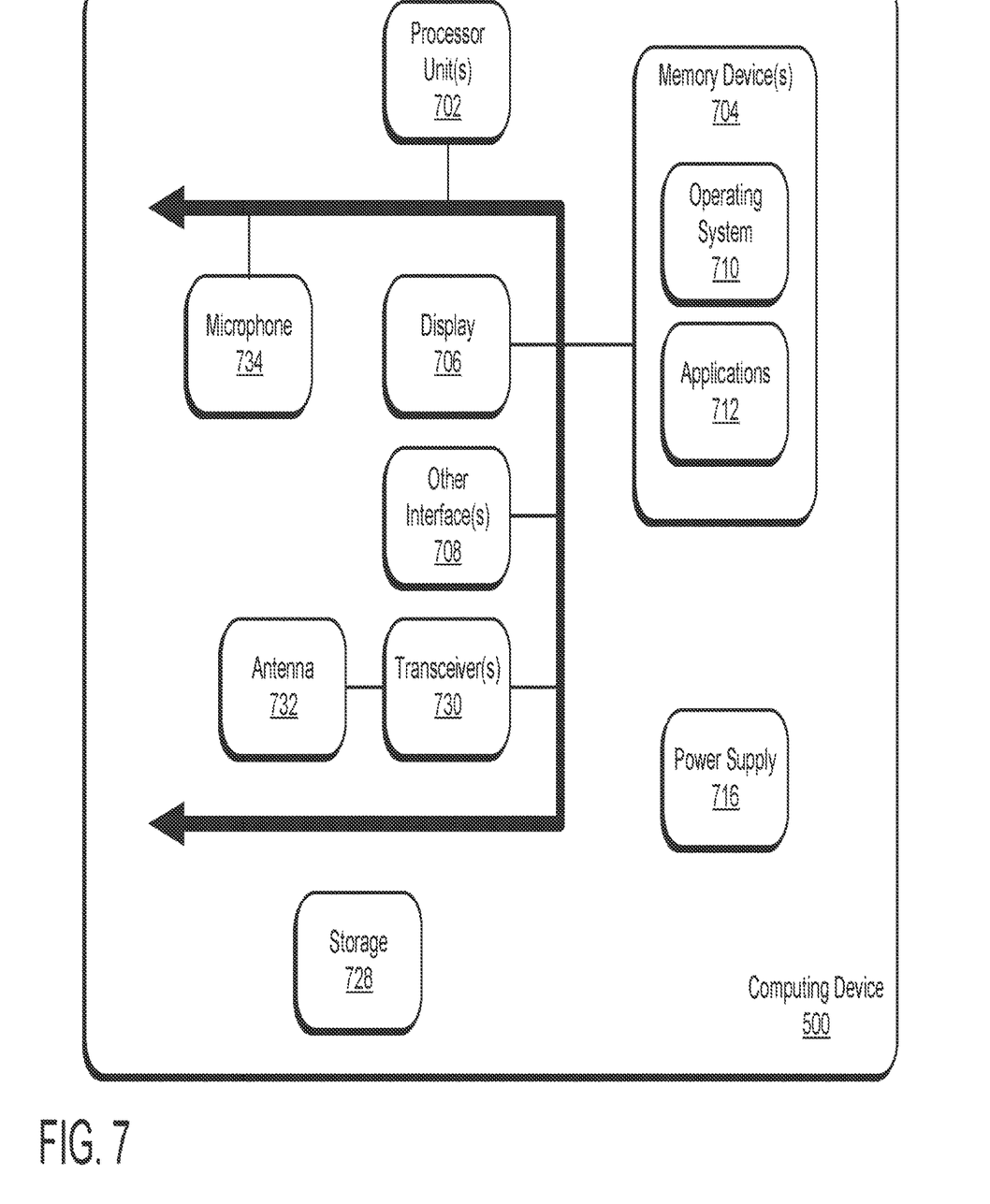
FIG. 7 illustrates an example schematic of a computing device useful for controlling conversational digital assistant interactivity according to the described technology.

FIG. 7 illustrates an example schematic of an example computing device 700 useful for controlling conversational digital assistant interactivity according to the described technology. The example computing device 700 includes one or more processor unit(s) 702, one or more memory devices 704, a display 706 (e.g., a touchscreen display or lights, a hardcopy output device such as a printer), and other interfaces 708 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory 704 and is executed by the processor unit(s) 702, although it should be understood that other operating systems may be employed.

The example computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 includes one or more communication transceivers 730 and an antenna 732 to provide network connectivity (e.g., a mobile phone network, Wi-Fi®, BlueTooth®). The computing device 700 may also include various other components, such as a positioning system (e.g., a global positioning satellite transceiver), one or more accelerometers, one or more cameras, an audio interface (e.g., a microphone 734, an audio amplifier and speaker and/or audio jack), and storage devices 728. Other configurations may also be employed.

One or more applications 712, such as a conversational digital assistant, and an interaction control subsystem, and other software are loaded in the memory 704 and executed on the operating system 710 by the processor unit(s) 702. In an example implementation, a mobile operating system, various applications and other modules and services may be embodied by instructions stored in memory 704 and/or storage devices 728 and processed by the processor unit(s) 702. Interaction pairs, knowledge data, contextual annotations, and other data may be stored in memory 704 and/or storage devices 708 as persistent datastores.

The computing device 700 may include a variety of tangible processor-readable storage media and intangible processor-readable communication signals. Tangible processor-readable storage media can be embodied by any available tangible storage media as an article of manufacture that can be accessed by the computing device 700 and includes both volatile and nonvolatile storage media, removable and non-removable storage media. Tangible processor-readable storage media excludes intangible and transitory communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible processor-readable storage medium to store logic. Examples of a storage medium may include one or more types of tangible processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable processor-executable instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method of controlling conversational interaction between a user and a conversational digital assistant executing on a computing device includes storing multiple interaction pairs in one or more datastores accessible by the conversational digital assistant. Each interaction pair includes an interaction query and an associated assistance operation. The example method detects an interactive engagement event between the user and the conversational digital assistant, responsive to the storing operation. The example method selects an interaction pair from the one or more datastores, responsive to the operation of detecting an interactive engagement event. The example method communicates the interaction query of the selected interaction pair to the user. The example method executes the associated assistance operation associated with the communicated interaction query, responsive to receipt of a response from the user to the interaction query.

Another example method of any preceding method includes detecting completion of the executed assistance operation and storing a new interaction pair in the one or more datastores, responsive to detecting the completion of the executing operation. The new interaction pair includes a new assistance operation configured to communicate a result of the executed assistance operation and a new interaction query requesting user authorization to execute the new assistance operation. The example method detects a subsequent interactive engagement event between a user and the conversational digital assistant, responsive to storing the new interaction pair. The example method also includes selecting the new interaction pair from the one or more datastores, responsive to the operation of detecting the subsequent interactive engagement event, communicating the new interaction query of the selected new interaction pair to the user, and executing the new assistance operation associated with the communicated new interaction query, responsive to receipt of a user response to the communicated new interaction query.

Another example method of any preceding method includes communicating a result of the executed assistance operation to the user.

Another example method of any preceding method is provided wherein the operation of selecting an interaction pair from the one or more datastores includes selecting the interaction pair from the one or more datastores based on a detected relationship between the interactive engagement event and the selected interaction pair.

Another example method of any preceding method is provided wherein the operation of selecting an interaction pair from the one or more datastores includes selecting the interaction pair from the one or more datastores independent of any detected relationship between the interactive engagement event and the selected interaction pair.

Another example method of any preceding method is provided wherein the operation of selecting an interaction pair from the one or more datastores includes detecting a context of the interactive engagement event, detecting a relationship between the interactive engagement event and the selected interaction pair based on the detected context of the interactive engagement event and context of the selected interaction pair, and selecting the interaction pair from the one or more datastores based on the detected relationship.

Another example method of any preceding method is provided wherein the operation of selecting an interaction pair from the one or more datastores includes selecting the interaction pair from the one or more datastores based on one or more priority weightings applied to the multiple interaction pairs stored in one or more datastores.

An example system for controlling conversational interaction between a user and a conversational digital assistant executing on a computing device includes one or more tangible processor-readable storage systems configured to store one or more datastores accessible by the conversational digital assistant. The one or more datastores store multiple interaction pairs. Each interaction pair includes an interaction query and an associated assistance operation. The example system includes one or more processing units and an interaction control subsystem executing on the one or more processing units. The interaction control subsystem is configured to detect an interactive engagement event between the user and the conversational digital assistant and subsequently to select one of the stored interaction pairs from the one or more datastores. The example system includes a communication interface coupled to the interaction control subsystem and configured to communicate the interaction query of the selected interaction pair to the user. The one or more processing units are configured to execute the associated assistance operation associated with the interaction query, responsive to receipt of a response from the user to the interaction query via the communication interface.

Another example system of any preceding system is provided wherein the one or more tangible processor-readable storage systems are further configured to store a new interaction pair in the one or more datastores, responsive to detecting completion of the executed assistance operation. The new interaction pair includes a new assistance operation configured to communicate a result of the executed assistance operation and a new interaction query requesting user authorization to execute the new assistance operation. The interaction control subsystem is further configured to detect a subsequent interactive engagement event between a user and the conversational digital assistant and subsequently to select the new interaction pair from the one or more datastores, responsive to detection of the subsequent interactive engagement event. The communications interface is further configured to communicate the new interaction query of the selected new interaction pair to the user, and the one or more processing units are further configured to execute the new assistance operation associated with the new interaction query, responsive to receipt of a user response to the new interaction query.

Another example system of any preceding system is provided wherein the communication interface is further configured to communicate a result of the executed assistance operation to the user.

Another example system of any preceding system is provided wherein the interaction control subsystem is configured to select the interaction pair from the one or more datastores based on a detected relationship between the interactive engagement event and the selected interaction pair.

Another example system of any preceding system is provided wherein the interaction control subsystem is configured to select the interaction pair from the one or more datastores independent of any detected relationship between the interactive engagement event and the selected interaction pair.

Another example system of any preceding system is provided wherein the interaction control subsystem is configured to detect a context of the interactive engagement event and to detect a relationship between the interactive engagement event and the selected interaction pair based on the detected context of the interactive engagement event and at least one context of the selected interaction pair and to select the interaction pair from the one or more datastores based on the detected relationship.

Another example system of any preceding system is provided wherein the interaction control subsystem is configured to select the interaction pair from the one or more datastores based on one or more priority weightings applied to the multiple interaction pairs stored in one or more datastores.

One or more tangible processor-readable storage media of a tangible article of manufacture encodes processor-executable instructions for executing on a computer system an example process of controlling conversational interaction between a user and a conversational digital assistant executing on a computing device. The example process includes storing multiple interaction pairs in one or more datastores accessible by the conversational digital assistant. Each interaction pair includes an interaction query and an associated assistance operation. The example process includes detecting an interactive engagement event between the user and the conversational digital assistant, responsive to the storing operation. The example process includes selecting an interaction pair from the one or more datastores, responsive to the operation of detecting an interactive engagement event. The example process includes communicating the interaction query of the selected interaction pair to the user and executing the associated assistance operation associated with the communicated interaction query, responsive to receipt of a response from the user to the interaction query.

Other one or more tangible processor-readable storage media encode processor-executable instructions for executing an example process of any preceding process and includes detecting completion of the executed assistance operation and storing a new interaction pair in the one or more datastores, responsive to detecting the completion of the executing operation. The new interaction pair include a new assistance operation configured to communicate a result of the executed assistance operation and a new interaction query requesting user authorization to execute the new assistance operation. The example process detects a subsequent interactive engagement event between a user and the conversational digital assistant, responsive to storing the new interaction pair. The example process includes selecting the new interaction pair from the one or more datastores, responsive to the operation of detecting the subsequent interactive engagement event, communicating the new interaction query of the selected new interaction pair to the user, and executing the new assistance operation associated with the communicated new interaction query, responsive to receipt of a user response to the communicated new interaction query.

Other one or more tangible processor-readable storage media encode processor-executable instructions for executing an example process of any preceding process that includes communicating a result of the executed assistance operation to the user.

Other one or more tangible processor-readable storage media encode processor-executable instructions for executing an example process of any preceding process is provided wherein the operation of selecting an interaction pair from the one or more datastores includes selecting the interaction pair from the one or more datastores independent of any detected relationship between the interactive engagement event and the selected interaction pair.

Other one or more tangible processor-readable storage media encode processor-executable instructions for executing an example process of any preceding process is provided wherein the operation of selecting an interaction pair from the one or more datastores includes detecting a context of the interactive engagement event, detecting a relationship between the interactive engagement event and the selected interaction pair based on the detected context of the interactive engagement event and context of the selected interaction pair, and selecting the interaction pair from the one or more datastores based on the detected relationship.

Other one or more tangible processor-readable storage media encode processor-executable instructions for executing an example process of any preceding process is provided wherein the operation of selecting an interaction pair from the one or more datastores includes selecting the interaction pair from the one or more datastores based on one or more priority weightings applied to the multiple interaction pairs stored in one or more datastores.

An example system for controlling conversational interaction between a user and a conversational digital assistant executing on a computing device includes means for storing multiple interaction pairs in one or more datastores accessible by the conversational digital assistant. Each interaction pair includes an interaction query and an associated assistance operation. The example system includes means for detecting an interactive engagement event between the user and the conversational digital assistant, responsive to storage of multiple interaction pairs in the one or more datastores. The example system includes means for selecting an interaction pair from the one or more datastores, responsive to detection of an interactive engagement event. The example system includes means for communicating the interaction query of the selected interaction pair to the user. The example system includes means for executing the associated assistance operation associated with the communicated interaction query, responsive to receipt of a response from the user to the interaction query.

An example system of any preceding method includes means for detecting completion of the executed assistance operation and means for storing a new interaction pair in the one or more datastores, responsive to detection of the completion of the executing operation. The new interaction pair include a new assistance operation configured to communicate a result of the executed assistance operation and a new interaction query requesting user authorization to execute the new assistance operation. The example system includes means for detecting a subsequent interactive engagement event between a user and the conversational digital assistant, responsive to storage of the new interaction pair. The example system includes means for selecting the new interaction pair from the one or more datastores, responsive to the detection of the subsequent interactive engagement event. The example system includes means for communicating the new interaction query of the selected new interaction pair to the user. The example system includes means for executing the new assistance operation associated with the communicated new interaction query, responsive to receipt of a user response to the communicated new interaction query.

Another system of any preceding system includes means for communicating a result of the executed assistance operation to the user.

Another system of any preceding system is provided wherein the means for selecting an interaction pair from the one or more datastores includes means for selecting the interaction pair from the one or more datastores based on a detected relationship between the interactive engagement event and the selected interaction pair.

Another system of any preceding system is provided wherein the means for selecting an interaction pair from the one or more datastores includes means for selecting the interaction pair from the one or more datastores independent of any detected relationship between the interactive engagement event and the selected interaction pair.

Another system of any preceding system is provided wherein the means for selecting an interaction pair from the one or more datastores includes means for detecting a context of the interactive engagement event, means for detecting a relationship between the interactive engagement event and the selected interaction pair based on the detected context of the interactive engagement event and context of the selected interaction pair, and means for selecting the interaction pair from the one or more datastores based on the detected relationship.

Another system of any preceding system is provided wherein the means for selecting an interaction pair from the one or more datastores includes means for selecting the interaction pair from the one or more datastores based on one or more priority weightings applied to the multiple interaction pairs stored in one or more datastores.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A system comprising:
   a processor; and
   memory coupled to the processor, the memory comprising computer executable instructions that, when executed by the processor, perform a method comprising:
   detecting an interactive engagement event between a user and a conversational digital assistant executing on a computing device;
   in response to detecting the interactive engagement event, selecting an interaction pair stored in an interaction database of one or more tangible data storage systems for user devices accessible by the conversational digital assistant, wherein the interaction pair includes an interaction query comprising a further asistant-initiated conversation and an assistance operation that executes on the user devices associated with the interaction query;
   causing the interaction query to be provided to the user by the conversational digital assistant; and
   based on a response by the user to the interaction query, executing the assistance operation, wherein executing the assistance operation exposes new or undiscovered functionality of the conversational digital assistant to the user.

2. The system of claim 1, wherein the computer executable instructions perform the method further comprising:
   monitoring, by the conversational digital assistant, one or more events triggering storage of one or more interaction pairs, the one or more interaction pairs including the interaction pair; and
   in response to detecting at least one of the one or more events, storing the one or more interaction pairs in the one or more datastores.

3. The system of claim 2, wherein storing the one or more interaction pairs comprises executing an opening operation for an incomplete task record in the one or more datastores.

4. The system of claim 3, wherein the conversational digital assistant presents one or more interaction queries to the user in an effort to close the incomplete task record.

5. The system of claim 1, wherein the interaction query represents subject matter of a conversation initiated with the user by the conversational digital assistant.

6. The system of claim 1, wherein the interaction query is at least one of:
   an instruction;
   actual dialog; or
   a pointer or index.

7. The system of claim 1, wherein the assistance operation represents an operation the conversational digital assistant executes on the computing device.

8. The system of claim 1, wherein the interactive engagement event is a commitment by the user to perform an action.

9. The system of claim 8, wherein, when the commitment is detected, a commitment interaction pair is stored in the one or more datastores, the commitment interaction pair comprising a reminder to the user of the commitment.

10. The system of claim 1, wherein the interactive engagement event is at least one of:
    a notification from a network-based service;
    an internal system change of the computing device or the conversational digital assistant; or
    verbal input by the user.

11. The system of claim 1, wherein the computer executable instructions perform the method further comprising:
    further in response to detecting the interactive engagement event, providing a response for the interactive engagement event to the user, wherein the response is provided to the user before the interaction query is provided to the user.

12. The system of claim 1, wherein the interaction pair further includes a contextual annotation indicating a context in which the interaction pair is relevant.

13. The system of claim 1, wherein selecting the interaction pair from one or more datastores includes use of an interaction schedule, the interaction schedule defining a time one or more interaction pairs is available to the user.

14. The system of claim 1, wherein executing the assistance operation includes toggling on a setting of the computing device, the setting enabling updates to be automatically provided to the user without the user explicitly requesting the updates.

15. The system of claim 1, wherein the conversational digital assistant stores records of interactive engagement events in a knowledge datastore.

16. The system of claim 15, wherein the knowledge datastore comprises details of events performed using the computing device.

17. A method comprising:
    detecting an interactive engagement event between a user and a conversational digital assistant executing on a computing device;

in response to detecting the interactive engagement event, selecting an interaction pair stored in an interaction database of one or more tangible data storage systems for user devices accessible by the conversational digital assistant, wherein the interaction pair includes an interaction query comprising a future assistant-initiated conversion and an assistance operation that executes on the user devices associated with the interaction query;

causing the interaction query to be provided to the user by the conversational digital assistant; and based on a response by the user to the interaction query, executing the assistance operation, wherein executing the assistance operation exposes new or undiscovered functionality of the conversational digital assistant to the user.

18. The method of claim 17, wherein causing the interaction query to be provided to the user comprises:

causing an automated response from the conversational digital assistant to be provided to the user; and subsequent to providing the automated response to the user, providing the interaction query to the user.

19. The method of claim 18, wherein the automated response indicates that search results for a user query corresponding to the interactive engagement event cannot currently be provided to the user.

20. A computing device comprising:

a processor; and memory coupled to the processor, the memory comprising computer executable instructions that, when executed by the processor, perform a method comprising:

detecting an interactive engagement event between a user and a conversational digital assistant executing on the computing device;

in response to detecting the interactive engagement event, selecting an interaction pair stored in an interaction database of one or more tangible data storage system for user devices accessible by the conversational digital assistant, wherein the interaction pair includes an interaction query comprising a future assistant-initiated conversation and an assistance operation that executes on the user devices associated with the interaction query;

causing the interaction query to be provided to the user by the conversational digital assistant; and based on a response by the user to the interaction query, executing the assistance operation, wherein executing the assistance operation exposes new or undiscovered functionality of the conversational digital assistant to the user.

\* \* \* \* \*